(12) United States Patent
Can et al.

(10) Patent No.: US 7,193,182 B2
(45) Date of Patent: Mar. 20, 2007

(54) HEATING ELECTRIC CIGAR LIGHTER PLUG AND THE ARRANGEMENT OF A CIGAR LIGHTER COMPRISING THIS PLUG

(75) Inventors: Jean-Michel Can, Bobigny Cedex (FR); Patrick Refouni, Bobigny Cedex (FR); Pascal Thibaut, Bobigny Cedex (FR)

(73) Assignee: Valeo Vision, Bobigny (FR)

(*) Notice: Subject to any disclaimer, the term of this patent is extended or adjusted under 35 U.S.C. 154(b) by 58 days.

(21) Appl. No.: 10/911,307

(22) Filed: Aug. 4, 2004

(65) Prior Publication Data
US 2005/0082270 A1    Apr. 21, 2005

(30) Foreign Application Priority Data
Aug. 7, 2003   (FR) .................................. 03 09751

(51) Int. Cl.
*F23Q 7/22* (2006.01)
(52) U.S. Cl. ................. 219/267; 219/265; 219/260; 439/215
(58) Field of Classification Search ............... 219/260, 219/261, 262, 263, 264, 265, 266, 267, 268, 219/269, 270
See application file for complete search history.

(56) References Cited

U.S. PATENT DOCUMENTS

| | | | |
|---|---|---|---|
| 1,373,583 A | 4/1921 | Adams | |
| 1,376,154 A | 4/1921 | Morris | |
| 1,417,422 A | 5/1922 | Strubing | |
| 2,275,922 A | 3/1942 | Reyburn | |
| 2,292,918 A * | 8/1942 | Ashton | 219/265 |
| 2,467,473 A | 4/1949 | Gray | |
| 2,528,500 A | 11/1950 | Davis | |
| 3,356,826 A * | 12/1967 | Krautwurst et al. | 219/267 |
| 3,863,047 A * | 1/1975 | Mase | 219/265 |
| 5,144,111 A | 9/1992 | Von Gaisberg et al. | |
| 6,188,042 B1 | 2/2001 | Sheen | |
| 2005/0014408 A1* | 1/2005 | Swiatek et al. | 439/215 |

FOREIGN PATENT DOCUMENTS

| | | |
|---|---|---|
| DE | 29621464 | 2/1997 |
| GB | 830152 | 3/1960 |
| JP | 54 065669 | 5/1979 |
| JP | 61 031817 | 2/1986 |

OTHER PUBLICATIONS

French Search Report dated Apr. 15, 2004.

* cited by examiner

*Primary Examiner*—Robin Evans
*Assistant Examiner*—Leonid M. Fastovsky
(74) *Attorney, Agent, or Firm*—Morgan & Finnegan, LLP (57) ABSTRACT

A heating plug for an electric cigar lighter, in particular for a cigar lighter equipping a motor vehicle, has a plug body designed to be inserted axially in a complementary female socket body equipped with electrical connection terminals. A push button is mounted so as to be able to move axially with respect to the plug body, between a neutral position and a pushed-in position in which it causes closure of an electrical circuit for supplying electrical current to a heating element arranged in the plug. The heating element has a lighting face which is accessible from the outside of the plug when the plug is removed from the socket body. The lighting face of the element is roughly parallel to the insertion axis of the plug.

18 Claims, 4 Drawing Sheets

HEATING ELECTRIC CIGAR LIGHTER PLUG AND THE ARRANGEMENT OF A CIGAR LIGHTER COMPRISING THIS PLUG

FIELD OF THE INVENTION

The invention concerns an electric cigar lighter. The invention concerns more particularly a heating plug for an electric cigar lighter, in particular for a cigar lighter equipping a motor vehicle, comprising a plug body designed to be inserted axially in a complementary female socket body equipped with electrical connection terminals, a push button which is mounted so as to be able to move axially with respect to the plug body, between a neutral position and a pressed-in position in which it causes the closure of an electrical circuit for supplying electric current to a heating element arranged in the plug, and of the type in which the heating element comprises a lighting face which is accessible from the outside of the plug, when the plug is removed from the socket body.

BACKGROUND OF THE INVENTION

A heating plug of this type is already known, for example through the document U.S. Pat. No. 5,144,111.

In U.S. Pat. No. 5,144,111, the cigar lighter comprises a heating plug provided with an electric heating element which is arranged at the bottom axial end of the heated plug.

When the heating plug is inserted in its complementary socket body and when the plug is pressed in, the element comes into contact with a metallic tongue arranged in the bottom of the socket body, which closes the electrical supply circuit for the heating plug.

The element is integral with respect to axial movement with a bistable bimetallic disc forming a bimetallic device so that, when the element reaches a given temperature, the bimetallic device returns the element upwards, which causes the opening of the electrical supply element.

SUMMARY OF THE INVENTION

The present invention aims in particular to allow the use in a socket body to the SAE standard or in a cigar lighter body to the SAE standard indifferently, and/or to improve the ergonomics of the heating plug during lighting.

This is because the usual arrangement of the element in the axis of the plug does not make it possible to use this plug in a socket body since the heating of the element may ignite it.

The invention thus aims to propose a heating plug able to be used with a standard SAE socket body.

The invention also aims to resolve the problem of the ash which is deposited in the bottom of the socket body, after lighting.

To this end, the invention proposes a heated electric cigar lighter plug, in particular of the type described previously, characterized in that the lighting face of the element is roughly (approximately) parallel to the insertion axis of the plug. It is a case in particular of a heated electric cigar lighter plug, in particular for a cigar lighter and/or an SAE standard 12 volt socket, equipping a motor vehicle, comprising a plug body designed to be inserted axially into a complementary female socket body equipped with electrical connection terminals and a push button which is mounted so as to be able to move axially with respect to the plug body, between a neutral position and a pressed-in position in which it causes the closure of an electrical circuit for supplying electric current to a heating element arranged in the plug, and of the type in which the heating element comprises a lighting face which is accessible from the outside of the plug, when the plug is removed from the socket body, with the lighting face of the element being roughly (approximately) parallel to the insertion axis of the plug.

According to other optional and cumulative or alternative characteristics of the invention:

- the heating plug comprises a shield which is mounted so as to be able to move on the plug body between a protection position in which the shield is interposed transversely between the lighting face of the element and the internal wall of the socket body, and an open position in which the shield leaves clear access to the lighting face of the element;
- the shield has roughly the shape of an axial sleeve comprising an opening being able to be arranged transversely facing the lighting face of the element, so as to allow access to the lighting face;
- the plug body comprises a portion in the form of a tubular jacket which encloses the element and which is provided with an access window to the lighting face of the element;
- the shield is mounted so as to slide axially on the external face of the portion in the form of a tubular jacket of the plug body;
- the shield comprises means of cooperation by elastic fitting in with the internal wall of the socket body so that, when the plug is extracted axially out of the socket body, the shield is retained axially inside the socket body until the shield occupies its open position on the plug body, and then remains in this position on the plug body, after the complete extraction of the plug out of the socket body;
- the heating plug comprises a bimetallic device which causes the closure of the electrical supply circuit of the heating element when the button is pressed in, and which causes the opening of die electrical supply circuit of the element when the element reaches a given temperature by Joule effect. The bimetallic device is preferably in the form of a clip, and causes the opening of the supply circuit through its deformation by closing up on itself;
- the bimetallic device is designed to engage with a conductive support, when the button is pressed in, so as to close the electrical circuit, and the bimetallic device, or the conductive support, is connected with respect to axial movement to the button, so that the rise in temperature in the bimetallic device by Joule effect causes the opening of the electrical circuit by automatic release of the bimetallic device out of the support and enables the button to return to its neutral position;
- the heating plug comprises an elastic means which returns the button from its pressed-in position to its neutral position;
- the heating plug comprises a protection fuse which is able to cause the opening of the electrical supply circuit of the element, in particular in the case of overheating caused by a persistent action of holding the plug in the engaged position.

The invention also proposes the arrangement of an electrical cigar lighter in a motor vehicle, characterized in that it comprises a heating plug produced in accordance with any of the above teachings and in that it comprises a socket body produced in accordance with the SAE standard, as well as the motor vehicle comprising at least one heating plug and at least one arrangement as described above.

Other characteristics and advantages of the invention will emerge from a reading of the following detailed description, for an understanding of which reference will be made to the accompanying drawings, in which:

For the description of the invention, the orientations vertical and transverse will be adopted non-limitingly in accordance with the reference V, T indicated in the figures.

In the description which follows, identical, similar or analogous elements will be designated by the same reference numbers.

Figure 1:
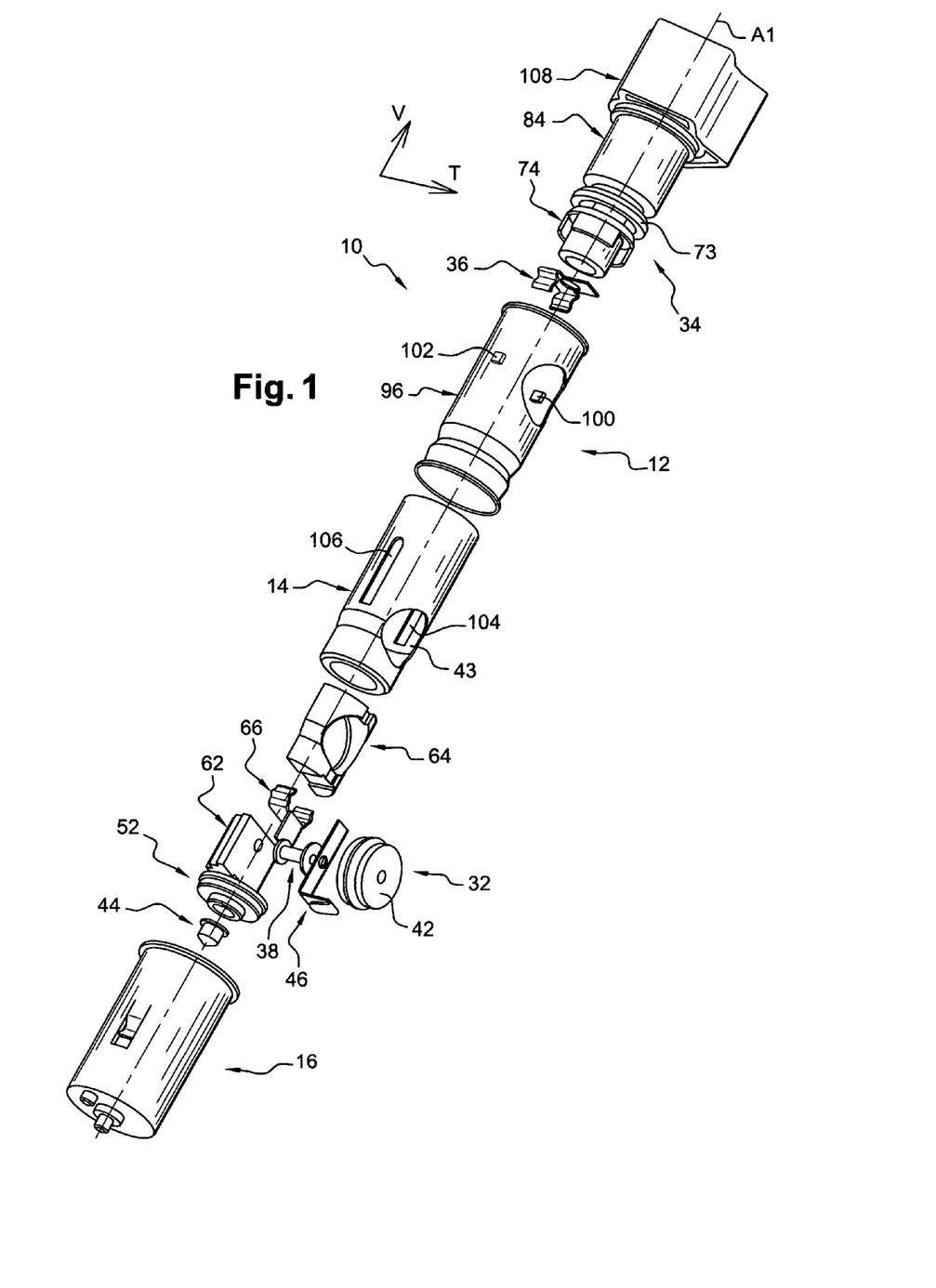
FIG. 1 is an exploded perspective view which depicts schematically an electric cigar lighter comprising a heating plug produced in accordance with the teachings of the invention and a standard socket body.

FIG. 1 depicts an electric cigar lighter 10 for a motor vehicle which is produced in accordance with the teachings of the invention.

This cigar lighter 10 consists essentially of a heating plug 12, the body 14 of which is designed to be inserted axially A1 in a complementary female socket body 16 equipping the vehicle.

The axis of insertion A1 of the heating plug 12 is here vertical.

The socket body 16 is connected to the electrical circuit of the vehicle, so that it can supply the heating plug 12 with electric current.

The socket body 16 is preferably produced in accordance with the SAE standard J563 defining the inside diameter of the body as being 20.93 to 21.01 mm.

Figure 2:
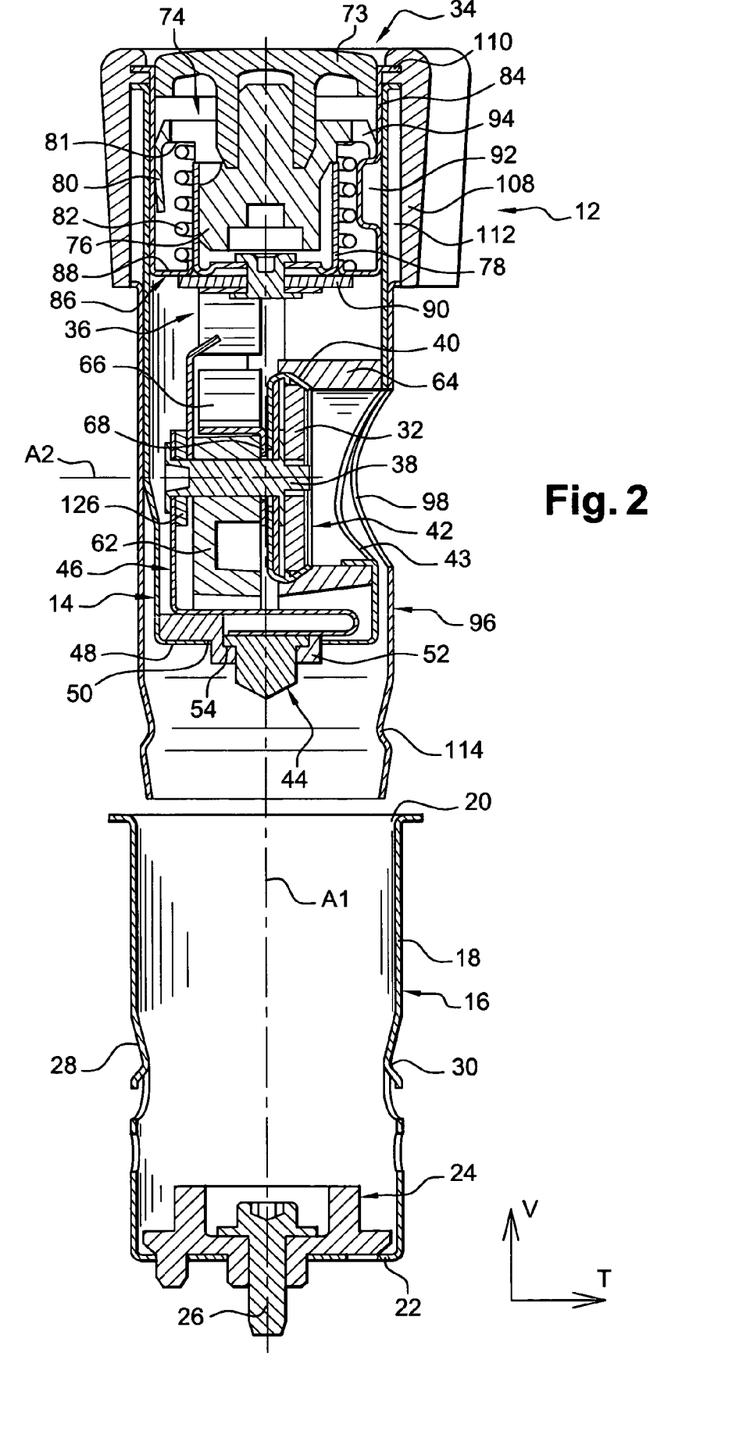
FIG. 2 is a view in axial section which depicts schematically the heating plug of the cigar lighter of FIG. 1 in the completely merged position with respect to the socket body.

Considering in particular FIG. 2, the socket body 16 comprises a metallic main wall 18, tubular overall, which delimits, at its top axial end, an opening 20 and which comprises, at its bottom axial end, a transverse bottom wall 22.

A base 24 made from electrically insulating material is mounted in the bottom wall 22, and an electrical contact screw 26 is mounted in the base 24, so that the screw 26 is electrically insulated with respect to the main wall 18 of the socket body 16.

The contact screw 26 forms here a positive electrical connection terminal.

The main wall 18, for its part, is connected to the earth of the electrical circuit of the vehicle so that it forms a negative electrical connection terminal.

The main wall 18 comprises two elastic tongues 28, 30, formed by cropping, which are diametrically opposed and which extend roughly axially downwards. Their function will be explained below.

According to the embodiment depicted here, the plug body 14 has overall the form of a tubular jacket.

The plug body 14 comprises, in its bottom portion, an electric heating element 32 and, in its top portion a push button 34 which controls the engagement of a bimetallic device 36 so as to cause the closure of the electrical supply circuit of the element 32.

In a known manner, the heating element 32 consists of a metallic strip wound in a spiral around a rivet 38 and arranged in a bowl 40.

The open side of the bowl 40 delimits a roughly planar lighting face 42 of the element 32 and in the form of a disc.

In accordance with the teachings of the invention, the lighting face 42 is roughly parallel to the insertion axis A1.

According to the embodiment depicted here, the rivet 38 extends in a radial direction A2 with respect to the insertion axis A1 and the lighting face 42 is substantially perpendicular to the axis A2 of the rivet 38.

In the remainder of the description, there will be used non-limitingly a radial orientation from rear to front, along the axis A2 of the rivet 38, which corresponds to an orientation from left to right looking at FIG. 2.

The plug body 14 comprises, radially opposite the lighting face 42, an access window 43.

The lighting face 42 is preferably offset radially towards the inside of the plug body 14, with respect to the access window 43.

Figure 6:
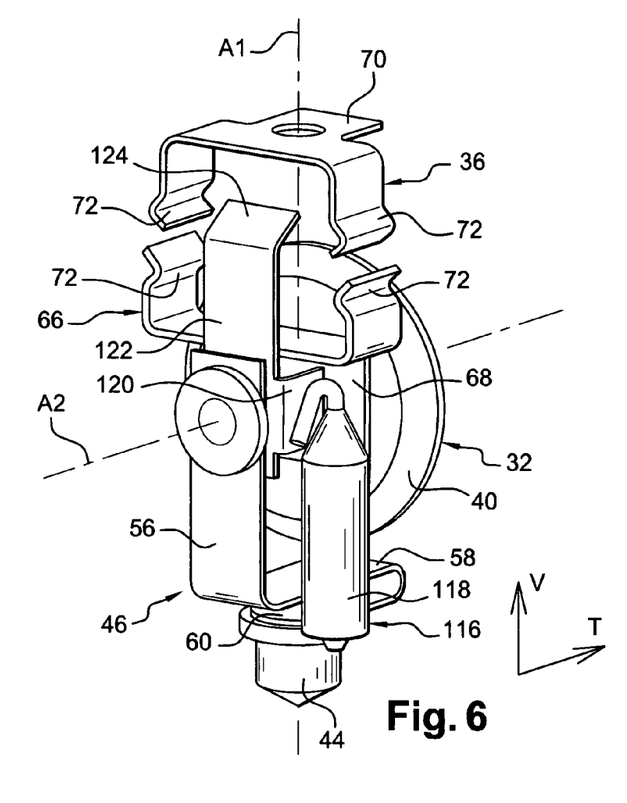
FIG. 6 is a perspective view which depicts schematically a part of the supply circuit of the beating plug.

As can be seen in particular in FIG. 6, the rivet 38 is electrically connected to a contact stud 44 arranged at the bottom end of the plug body 14 by means of a conductive blade 46.

The plug body 14 comprises, at its bottom axial end, a transverse wall 48 provided with a central opening 50 in which there is arranged an annular centering device 52 made from insulating material.

The contact stud 44 is mounted so as to slide axially in the hole in the centering device 52 and comprises an annular radial stop surface 54, oriented downwards, which comes into abutment axially against a shoulder on the centering device 52.

The conductive blade 46 comprises here a first portion 56 which extends vertically downwards, from the rear axial end of the rivet 38, and a second portion 58 which extends radially towards the front, from the bottom end of the first portion 56, and which is folded on itself so as to form two vertically superimposed branches, the free end 60 of the second portion 58 being fixed to the top transverse face of the contact stud 44.

The second portion 58 therefore forms a spring blade which allows an axial movement of the contact stud 44 with a view to taking up the axial clearance with the socket body 16.

The rivet 38 is here mounted in a support plate 62 which is fixed with respect to the plug body 14.

The support plate 62 is produced from insulating material, for example ceramic.

Advantageously, an insulating ring 64 coaxial with the rivet 38 is arranged around the element 32, from the external edge of the bowl 40 as far as the edge of the access window 43, so as to minimise the diffusion, inside the plug body 14, of the heat coming from the element 32.

The insulating ring 64 is for example produced from ceramic.

A conductive support 66, complementary to the bimetallic device 36, is arranged above the support plate 62.

The conductive support 66 consists here of a U-shaped metallic blade comprising a vertical fixing and electrical connection lug 68 perpendicular to the rivet 38.

The vertical lug 68 is interposed here between the vertical face of the support plate 64 and the rear face of the bowl 40.

The conductive support 66 is therefore fixed with respect to the plug body 14, whilst the bimetallic device 36 is fixed to the push button 34, which is able to move with respect to the plug body 14.

Naturally, according to a variant embodiment (not shown), the bimetallic device 36 is fixed with respect to the plug body 14 and the conductive support 66 is able to move with respect to the plug body 14.

The bimetallic device 36 consists of a bimetallic strip in the form of an inverted U comprising a top transverse lug 70 with a hole in it.

At ambient temperature, the bimetallic device 36 is designed to engage by elastic fitting-in in the conductive support 66.

To this end, the free ends 72 of the branches of the conductive support 66 and of the bimetallic device 36 each comprise transverse protrusions designed to allow the axial holding of the bimetallic device 36 in the conductive support 66, at ambient temperature.

The push button 34 comprises here a top support disc 73 which is fixed in the top transverse face of an insulating end piece 74.

The insulating end piece 74 comprises a substantially cylindrical core 76 which extends axially downwards and which is fitted in a tubular bimetallic device holder 78.

The bimetallic device 36 is riveted, by its transverse lug 70, to the bottom transverse face of the bimetallic device holder 78.

The insulating end piece 74 comprises here, at its top axial end, a cylindrical skirt 80 which extends axially downwards, along the external cylindrical wall of the core 76.

The portion of the insulating end piece 74 which connects the cylindrical skirt 80 to the core 76 forms a downward-oriented radial support surface 81 for a helical compression spring 82.

The push button 34 is mounted so as to be able to move inside a substantially cylindrical guide socket 84.

The guide socket 84 is fitted in the top portion of the plug body 14, so that it is fixed with respect to the plug body 14.

The guide socket 84 comprises, at its bottom axial end, an internal collar 86 which delimits an upward-oriented radial support surface 88 for the spring 82.

The spring 82 is mounted so as to be compressed axially between the support surface 88 of the guide socket 84 and the support surface 81 of the insulating end piece 74, so as to elastically return the push button 34 upwards.

Figure 3:
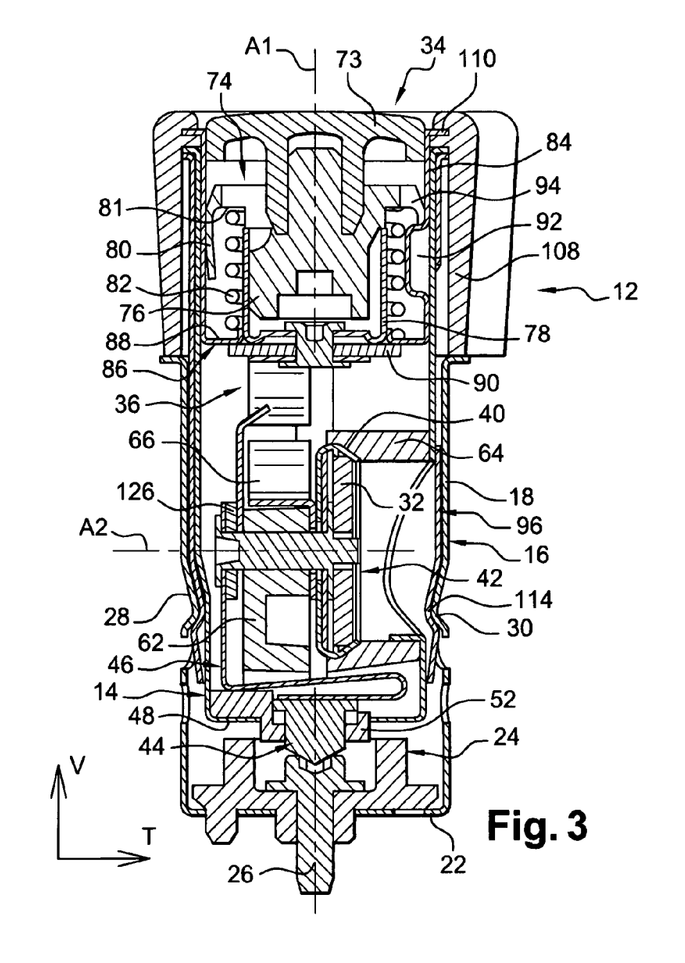
FIG. 3 is a view similar to that in FIG. 2 which depicts the heating plug in the inserted position in the socket body and which depicts the push button controlling the heating of the element in the neutral position.
Figure 4:
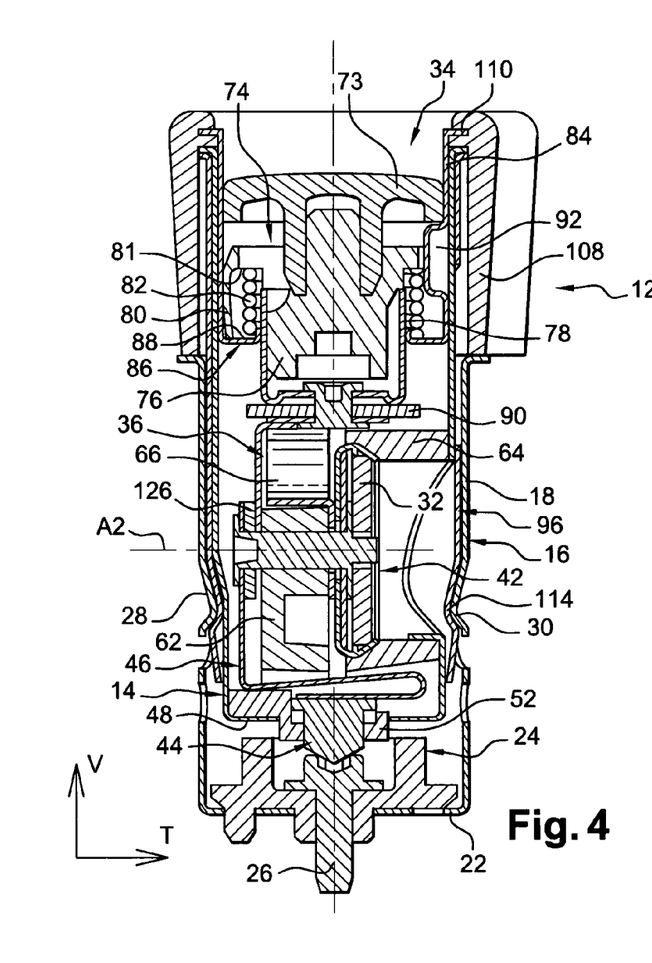
FIG. 4 is a view similar to that in FIG. 2 which depicts the heating plug during the phase of heating the element, the push button occupying its pressed-in position.
Figure 5:
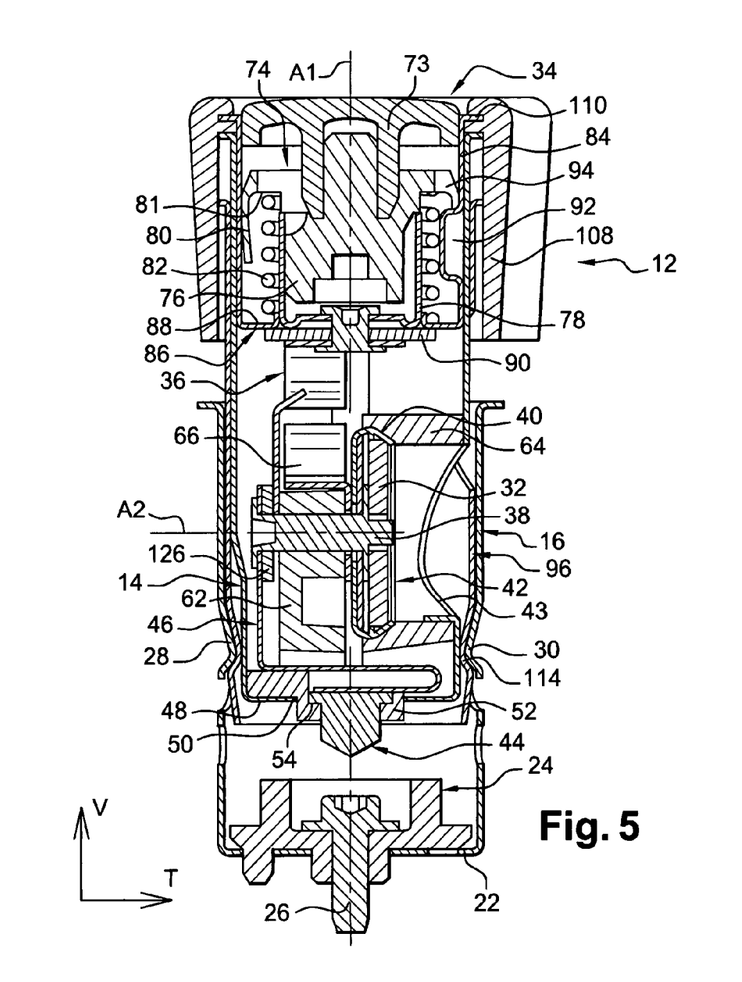
FIG. 5 is view similar to that of FIG. 2 which depicts the heating plug during its removal from the socket body, after the phase of heating tile element.

The push button 34 is therefore able to move axially between a high position, or neutral position, which is depicted in FIGS. 2, 3 and 5, and a low position, or pressed-in position, which is depicted in FIG. 4, in which the bimetallic device 36 is engaged in its support 66.

According to the embodiment depicted here, the push button 34 comprises an insulating plate 90 which is interposed axially between the bimetallic device 36 and the bottom transverse face of the bimetallic device holder 78, and which comes into axial abutment against the bottom radial face of the collar 86, when the push button 34 is in the neutral position.

Advantageously, the internal cylindrical wall of the guide socket 84 comprises axial ribs 92 which cooperate with associated axial notches 94 in the cylindrical skirt 80, so as to angularly immobilise and axially guide the push button 34 with respect to the plug body 14.

According to another advantageous characteristic of the invention, the heating plug 12 comprises a heat shield 96 forming an obturator which is mounted so as to be able to move on the plug body 14 between a protection position and an open position.

In the protection position, which is depicted in FIGS. 3, 4 and 5, the shield 96 is interposed radially between the lighting face 42 of the element 32 and the internal face of the main wall 18 of the socket body 16.

In the open position, which is depicted in FIG. 2, the shield 96 leaves clear access to the lighting face 42 of the element 32.

According to the embodiment depicted here, the shield 96 has roughly the form of an axial sleeve comprising an opening 98 able to be arranged radially opposite the lighting face 42 of the element 32.

The shield 96 is preferably mounted so as to slide axially on the external face of the plug body 14, the protection position corresponding to a high position on the plug body 14, and the open position corresponding to a low position on the plug body 14.

As can be seen in FIG. 1, the shield 96 comprises, on its internal axial face, two guidance and stop lugs 100, 102 which are diametrically opposed and which cooperate with two associated axial grooves or slots 104, 106 produced in the plug body 14.

According to the embodiment depicted here, the heating plug 12 comprises a gripping ring 108 which is arranged around the top portion of the plug body 14.

The top axial end of the gripping ring 108 is moulded onto an external collar 110 arranged at the top axial end of the guide sleeve 84.

The gripping ring 108 delimits radially, with the external axial face of the plug body 14, a tubular guide space 112 for the top portion of the shield 96.

When the heating plug 12 is inserted in the socket body 16, the gripping ring 108 is designed here to come into axial abutment, through its bottom end, against the top end of the socket body 16.

The shield 96 comprises, in the external axial thee of its bottom portion, an annular radial groove 114 which is able to cooperate by fitting-in with the elastic tongues 28, 30 of the socket body 16 so as to hold the shield 96 axially in the socket body 16 when the heating plug 12 is inserted in the socket body 16.

The shield 96 is here produced from metal, so as to conduct electricity between the plug body 14 and the socket body 16.

Advantageously, the heating plug 12 comprises a protective fuse 116 which is able to cause the opening of the electrical supply circuit of the element 32.

According to the embodiment depicted here, the fuse 116 comprises a cylindrical main body 118 which extends inside the plug body 14, parallel to the vertical portion 56 of the conductive blade 46.

The bottom axial end of the main fuse body 118 is in electrical contact with the transverse wall 48 of the plug body 14 and the top axial end of the main fuse body 118 is electrically connected to an electrical connection and fixing lug 120 forming part of a conductive tongue 122.

The conductive tongue 122 is perpendicular to the rivet 38 and extends axially upwards.

The top axial end of the conductive tongue 122 is curved forwards so as to form an elastic lug 124 able to provide electrical contact with the bimetallic device 36, when the latter engages with its support 66.

The conductive tongue 122 is interposed radially between the conductive blade 46 and the rear vertical face of the support plate 62.

An insulating washer 126 is interposed radially between the conductive tongue 122 and the conductive blade 46.

The functioning of the electric cigar lighter 10 equipped with the heating plug 12 according to the invention is now explained.

When the cigar lighter 10 is not being used, the heating plug 12 is inserted in the socket body 16, the push button 34 occupying its neutral position, as depicted in FIG. 3.

The electrical supply circuit of the heating element 32 is then open, since the bimetallic device 36 is not in contact with its support 66.

When the heating plug 12 is inserted in the socket body 16, the shield 96 occupies its protection position and the shield 96 is fitted in the socket body 16 by means of the elastic tongues 28, 30.

Advantageously, the bottom portion of the plug body 14 has a diameter less than its top portion, which assists the insertion of the plug 12 in the socket body 16 without rubbing and therefore without premature wear on the material.

When a user wishes to use the cigar lighter 10, he exerts an axial pressure directed downwards on the push button 34, compressing the spring 82, until the bimetallic device 36 engages in its support 66, as illustrated in FIG. 4.

It should be noted that the cooperation of the ribs 92 on the guide socket 84 with the notches 94 on the insulating end piece 74 guarantees correct angular positioning of the bimetallic device 36 with respect to its conductive support 66.

Advantageously, the ribs 92 and the associated notches 94 are angularly distributed in a non-regular manner around the axis A1, so as to fulfill a locating function, when the push button 34 is mounted in the heated heating plug 12.

The engagement of the bimetallic device 36 with its support 66 therefore causes the closure of the electrical supply circuit of the heating element 32 in the following manner.

The electric current coming from the electrical circuit of the vehicle is brought to the cigar lighter 10 by the contact screw 26.

The current then flows successively through: the contact stud 44, the conductive blade 46, the rivet 38, the element 32, the bowl 40, the conductive support 66, the bimetallic device 36, the conductive tongue 122, the fuse 116, the plug body 14, the shield 96, and finally the socket body 16 which is connected to the vehicle earth.

As can be seen in FIGS. 3 and 4, the mounting for axial sliding of the contact stud 44 in the plug body 14 and its elastic return downwards by virtue of the elasticity of the second portion 58 of the conductive blade 46 ensures electrical contact with the contact screw 26, for different values of axial clearance between the plug body 14 and the socket body 16.

The closure of the electrical supply circuit of the element 32 causes the rise in temperature of the element 32 by Joule effect.

By virtue of the presence of the heat shield 96 in the protection position, which closes off the access window 43 to the heating face 42, the element 32 can heat up without damaging the socket body 16.

When the element 32 reaches a given temperature, sufficient for lighting a cigarette, the bimetallic device 36 reaches, by Joule effect, a given temperature which causes its deformation, so that it is no longer held axially by its conductive support 66.

The rise in temperature of the bimetallic device 36 therefore causes the opening of the electrical supply circuit of the element 32 by automatic release of the bimetallic device 36 out of the conductive support 66.

The spring 82 can then relax, causing the return of the push button 34 from its pressed in position to its neutral position, as illustrated by FIG. 5.

The return of the push button 34 into its neutral position warns the user of the end of heating of the element 32. The user can then remove the heating plug 12 from the socket body 16, gripping it by the gripping ring 108.

As illustrated by FIG. 5, during the axial removal of the heating plug 12, the shield 96 is firstly hold axially in its fitted-in position, so that the plug body 14 slides axially upwards, with respect to the shield 96, which remains fixed with respect to the socket body 16.

When the lugs 100, 102 on the shield 96 come into axial abutment in the ends of the associated stops 104, 106 in the plug body 14, which corresponds to the view in FIG. 2, then the axial force exerted by the user in order to extract the heating plug 12 causes the release of the shield 96 out of the socket body 16.

The shield 96 then occupies its open position on the plug body 14, so that the user has access to the heating face 42, which enables him to light a cigarette.

Advantageously, the shield 96 is held in its open position by rubbing against the plug body 14 and/or against the gripping ring 108.

For reasons of safety, should the push button 34 be held in the pressed-in position during the phase of heating the element 32, after the release of the bimetallic device 36, then the fuse 116 triggers, which causes the opening of the electrical supply circuit of the element 32, and therefore the stoppage of the heating.

According to a variant embodiment (not shown), the fuse 116 can be mounted removably in the heating plug 12, so that, in the event of overheating, it is possible to change only the fuse 116 rather than the plug 12 in its entirety.

It will be noted that the ergonomics of use of the heating plug 12 according to the invention is better than that of a heating plug according to the prior art.

This is because the movements used for lighting have great similarities with those used during lighting with a lighter, since the heating plug 12 can be held vertically like a lighter, and the cigarette brought substantially radially close to the lighting face 42.

The improvement in ergonomics in particular minimizes the risk of having the user release the heating plug 12 when the user is handling it.

The novel ergonomics of the heating plug 12 also reduces the risks of burning on the face of the user, in the case of abrupt braking for example.

In addition, the lighting face 42 is arranged so as to be highly recessed radially, with respect to the external cylindrical envelope of the plug 12, consisting here of the shield 96, which reduces the risks of unwanted contact between the lighting face 42 and an element external to the plug 12.

Advantageously, the gripping ring 108 of the heating plug 12 is conformed externally so as to provide a user with an indication about the angular position of the lighting face 42 with respect to the axis A1 of the heating plug 12.

Another advantage of the heating plug 12 according to the invention is the presence of the shield 96 which exerts an additional ash-guard function.

This is because, after the lighting of a cigarette, ash may remain on the lighting face 42 of the element 32.

In a cigar lighter according to the prior art, when the heating plug is replaced in the socket body, the ashes tend to be deposited in the bottom of the socket body.

With the heating plug 12 according to the invention, when the heating plug 12 is replaced in the socket body 16, the shield 96 closes the access window 43 to the element 32, so that the ashes are enclosed inside the plug body 14.

The heating plug 12 according to the invention has the advantage of being able to be arranged in any standard SAE socket body 16 without its being necessary to adapt this socket body 16 to the cigar lighter function. And this is a major advantage on an industrial point of view: instead of producing entirely different products depending they are power outlets (12V for example) or cigar lighters, it becomes possible, according to the invention, to produce a unique body which can serve either as a power outlet or as a cigar lighter body, the differentiation between the tow products is carried out only with the plug one can add to the body if one want to add the cigar lighter functionality to the power outlet.

What is claimed is:

1. A heating plug for an electric cigar lighter comprising
    a plug body designed to be inserted axially in a complementary female socket body equipped with electrical connection terminals;
    a push button which is mounted so as to be able to move axially with respect to the plug body, between a neutral position and a pressed-in position in which the push button causes closure of an electrical circuit for supplying electric current to a heating element arranged in the heating plug, and of the type in which the heating element comprises a lighting face which is accessible from an outside of the heating plug, when the heating plug is removed from the socket body, with the lighting face of the heating element roughly parallel to an insertion axis of the heating plug;
    a bimetallic device provided on the heating plug; and
    a shield comprising an axial sleeve and mounted so as to be able to move on the plug body between a protection position in which the shield is interposed transversely between the lighting face of the heating element and an internal wall of the socket body, and an open position in which the shield leaves clear access to the lighting face of the heating element.

2. A heating plug according to claim 1, wherein the plug body comprises a portion forming a tubular jacket which encloses the heating element and which is provided with an access window to the lighting face of the heating element.

3. A heating plug according to claim 1, wherein the plug body comprises
    a portion forming a tubular jacket which encloses the heating element and which is provided with an access window to the lighting face of the heating element, and
    the shield is mounted so as to slide axially on an external face of the portion forming the tubular jacket of the plug body.

4. A heating plug according to claim 3, wherein the shield comprises means of cooperation by elastic fitting in with the internal wall of the socket body so that, when the heating plug is extracted axially out of the socket body, the shield is retained axially inside the socket body until the shield occupies the open position on the plug body, and then remains in the open position on the plug body, after complete extraction of the heating plug out of the socket body.

5. A heating plug according to claim 1, wherein the bimetallic device is designed to engage with a conductive support, when the push button is pressed in, so as to close the electrical circuit, and the bimetallic device, or the conductive support, is connected with respect to axial movement to the push button, so that a rise in temperature in the bimetallic device by Joule effect causes the opening of the electrical circuit by automatic release of the bimetallic device out of the conductive support and enables the push button to return to the neutral position.

6. A heating plug according claim 1, wherein the bimetallic device is a clip, and in that the bimetallic device causes the opening of the electrical circuit through deformation by closing up on itself.

7. A heating plug according to claim 1, which comprises an elastic means which returns the push button from the pressed-in position to the neutral position.

8. A heating plug according to claim 1, which comprises a protective fuse mounted removably in the heated plug which is able to cause the opening of the electrical circuit of the heating element.

9. An arrangement of an electric cigar lighter in a motor vehicle, which comprises
    a heating plug according to claim 1, and
    a socket body in accordance with a SAE standard.

10. A motor vehicle, which comprises at least one heating plug according to claim 1.

11. A motor vehicle, which comprises at least one arrangement according to claim 9.

12. A heating plug according claim 1, wherein the bimetallic device is configured to cause closure of the electrical circuit of the heating element when the push button is pressed in, and to cause opening of the electrical circuit of the heating element when the heating element reaches a given temperature by Joule effect.

13. A heating plug according claim 1, wherein the bimetallic device is fixed with respect to the plug body.

14. A heating plug according to claim 1, wherein the bimetallic device is fixed to the push button.

15. A heating plug according claim 14, wherein the bimetallic device consists of a bimetallic strip in the form of an inverted U fixedly secured to the push button.

16. A heating plug for an electric cigar lighter for removable axial insertion in a complementary female socket body equipped with electrical connection terminals, the heating plug comprising:
    a plug body defining an insertion axis;
    a heating element arranged in the plug body, and comprising a lighting face roughly parallel to the insertion axis and accessible from an exterior of the heating plug when the heating plug is removed from the socket body;
    a push button axially movably mounted with respect to the plug body between a neutral position and a pressed position in which the push button causes supply of electric current to the heating element;
    a shield movably mounted on the plug body between a protection position in which the shield is interposed transversely between the lighting face and the socket body and an open position in which the shield leaves clear access to the lighting face of the heating element; and
    elastic fitting means for cooperating with an internal wall of the socket body so that, during removal of the heating plug from the socket body, the shield remains in the protection position inside the socket body and upon complete removal of the heating plug from the socket body, the shield automatically moves to the open position.

17. A cigar lighter heating plug for use with a complementary female socket body equipped with electrical connection terminals, the heating plug comprising
   a plug body designed to be removably axially inserted into the socket body along an insertion axis;
   a lighting face roughly parallel to the insertion axis and accessible from an exterior of the heating plug when the heating plug is removed from the socket body,
   a push button axially movably mounted with respect to the plug body between a neutral position and a pressed position which permits supply of electric current to the lighting face; and
   a heat shield movably mounted with respect to the plug body between at least two positions, in one of which the shield leaves clear access to the lighting face,
   wherein the shield automatically moves from the protection position to the open position upon complete removal of the heating plug from the socket body.

18. The heating plug according to claim 17, wherein the heat shield is adapted to axially slide on an external face of the plug body between a high position on the plug body which prevents access to the lighting face, and a low position on the plug body which leaves clear access to the lighting face.

* * * * *

UNITED STATES PATENT AND TRADEMARK OFFICE
CERTIFICATE OF CORRECTION

PATENT NO. : 7,193,182 B2
APPLICATION NO. : 10/911307
DATED : March 20, 2007
INVENTOR(S) : Jean-Michel Can et al.

It is certified that error appears in the above-identified patent and that said Letters Patent is hereby corrected as shown below:

At the Title page:

item 73, delete "Valco Vision" and insert --Valeo Vision--.

At column 2:

line 38, delete "die" and insert --the--.

At column 3:

line 24, delete "tile" and insert --the--.

At column 6:

line 42, delete "thee" and insert --face--.

At column 8:

line 16, delete "hold" and insert --held--.

Signed and Sealed this

First Day of May, 2007

JON W. DUDAS
*Director of the United States Patent and Trademark Office*